United States Patent [19]

Robertson et al.

[11] 3,888,086

[45] June 10, 1975

[54] FLOATING BOOM

[75] Inventors: Gerald W. Robertson, Dumfries; Terence Sturgeon, Locharbriggs, Dumfries, both of Scotland

[73] Assignee: Uniroyal Inc., Newbridge, Midlothian, Scotland

[22] Filed: Aug. 31, 1973

[21] Appl. No.: 393,359

[30] Foreign Application Priority Data
Sept. 4, 1972 United Kingdom............ 40958/72

[52] U.S. Cl. ............................................. 61/1 F
[51] Int. Cl. ........................................... E02b 15/04
[58] Field of Search..... 61/1 F, 5; 210/242, DIG. 21

[56] References Cited
UNITED STATES PATENTS

| 3,548,599 | 12/1970 | Reilly | 61/1 F |
|---|---|---|---|
| 3,592,006 | 7/1971 | Crucet | 61/1 F |
| 3,662,891 | 5/1972 | Headrick | 61/1 F X |
| 3,718,001 | 2/1973 | Harper | 61/1 F |
| 3,766,738 | 10/1973 | Gauch | 61/1 F |
| 3,786,637 | 1/1974 | Muramatsu et al. | 61/1 F |
| 3,839,869 | 10/1974 | Green | 61/1 F |

FOREIGN PATENTS OR APPLICATIONS

| 906,772 | 8/1972 | Canada | 61/1 F |
|---|---|---|---|
| 1,529,754 | 5/1968 | France | 61/1 F |
| 94,595 | 8/1959 | Norway | 61/1 F |

*Primary Examiner*—Paul R. Gilliam
*Assistant Examiner*—David H. Corbin
*Attorney, Agent, or Firm*—Philip Sands, Esq.

[57] ABSTRACT

A floating boom comprising a barrier for containing pollutant-debris along the surface of a body of water. The barrier is provided on each side thereof with oppositely directed bouyant members, and is ballasted along its lower longitudinally extending edge by means of an appropriate medium so that it maintains an upright attitude.

The foregoing abstract is neither intended to define the invention disclosed in the specification nor is it intended to be limiting as to the scope in any way.

8 Claims, 3 Drawing Figures

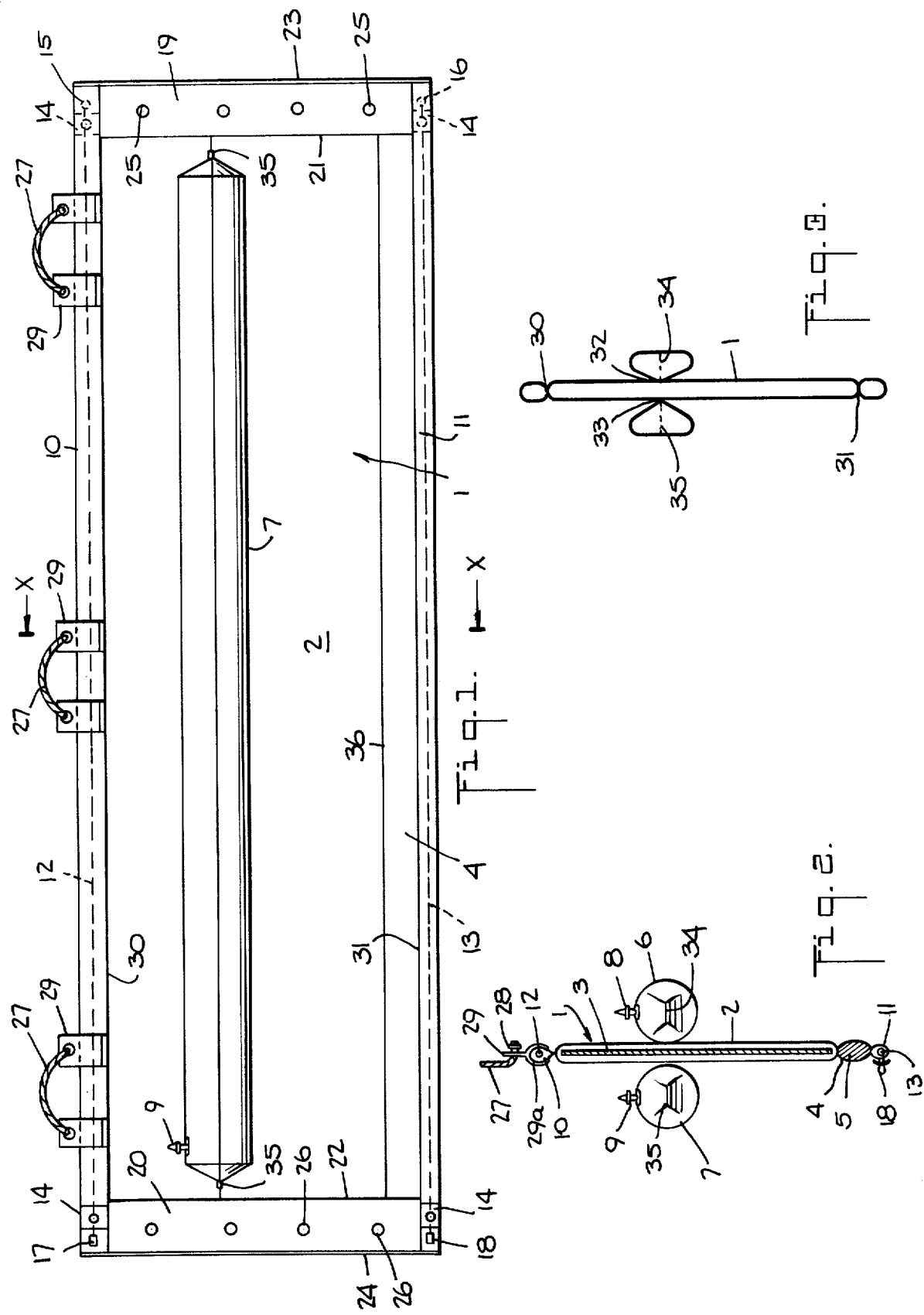

FLOATING BOOM

BACKGROUND OF THE INVENTION

This invention relates to a floating boom for preventing the uncontrolled spread of pollution, i.e. oil and other floating debris, along the surface of a body of water.

A number of floating booms have been developed in the past, but these have been invariably heavy and cumbersome to handle, and expensive to fabricate. An object of this invention is, therefore, to provide a boom that is light in weight and easy to handle, and can be fabricated effectively and at a cost sufficiently low to allow a soiled or used boom to be discarded or disposed of.

SUMMARY OF THE INVENTION

According to the present invention, the floating boom comprises an elongated barrier of waterproof material which defines a first compartment into which is sealed a stiffening medium of one or more substantially rigid boards extending substantially the full length of the barrier, a second sealed compartment extending substantially the full length of the barrier adjacent one longitudinally extending edge thereof, the second compartment being filled with a ballast medium, and at least one buoyant unit on each face of the barrier and extending longitudinally thereof. The buoyant units and ballast medium are so arranged that the boom will float with a stable upright attitude such that the second said compartment is submerged under water and part of the barrier projects above the surface of the water.

Such a boom provides an inexpensive and effective oil barrier and can, apart from the ballast, be made entirely of light-weight materials. The stiffening medium or rigid board (which is preferably a single sheet) may be fiber board or a rigid plastic sheet. The barrier which is compartmented in the form of a wallet, may be a flexible sheet of oil-resistant plastic material (such as polyvinylchloride or polyethylene), or of a plastic-coated woven or non-woven fabric heat-sealed to form the various compartments. The barrier may even, pursuant to one embodiment, be a multi-layer paper construction impregnated or coated with a water-proof, preferably oil-resistant material which is cemented or sealed to form the various compartments. In all these instances, the material is not only light-weight but is also inexpensive. If the ballast is also constituted of inexpensive material, for example sand, an entirely inexpensive boom can be readily made. More than one rigid board may be provided, arranged edge to edge in the wallet, the wallet preferably being pinched and sealed between the individual boards to form separate isolated pockets for the respective boards.

Preferably one buoyant unit is formed on each face of the wallet to extend substantially the full longitudinal length thereof, each buoyant unit being formed by folding, pinching and sealing the material of the wallet to form respective buoyant unit-accommodating sections. Each tubular section may be inflated or packed with foamed plastic material to provide the required buoyancy. It is contemplated that rather than be formed from the wallet material, each buoyant unit may be made separately and thereafter secured to the sides of the wallet.

The waterproof material of the wallet may be pinched and sealed to define two further compartments which extend longitudinally along the upper and lower edges of the boom, and tensile members may be inserted into these compartments to extend lengthwise beyond the ends thereof. The ends of the tension members of two adjacent booms may, thus, be secured or coupled to one another to form a longer boom assembly. Moreover, the ends of the booms to be coupled may also be fitted with fasteners to provide securing means for permitting coupling and uncoupling of the separate booms along the full height (lateral extent) thereof. The boom may, likewise, be fitted with carrying handles along the upper longitudinal edge thereof.

BRIEF DESCRIPTION OF THE DRAWINGS

A particular embodiment of a floating boom according to the invention will now be described in more detail, by way of example only, with reference to the accompanying drawings, in which:

FIG. 1 is a schematic front elevational view of the boom pursuant to the present invention;

FIG. 2 is a cross-sectional view taken along line X—X in FIG. 1; and

FIG. 3 is a cross-sectional view of the boom at an early stage of its fabrication.

DETAILED DESCRIPTION OF THE INVENTION

The boom as shown in the drawings comprises a multi-compartmented barrier in the form of a wallet constituted of waterproof material sealed to define a number of isolated compartments. In a first compartment 2 there is contained a stiffening medium preferably in the form of a single substantially rigid board 3, for example a fiber board or a rigid plastic material. The board 3 extends throughout the entire length and breadth of the compartment 2. Below the first compartment 2, there is disposed a second compartment 4 containing ballast material 5. To each side of the first compartment 2, the wallet 1 is folded, pinched and sealed to form tube-like pockets 6 and 7, each of which is fitted with an air valve 8 and 9, respectively, so that it may be inflated to form a buoyant compartment.

Along the upper and lower longitudinal end portions of the boom, the wallet 1 is pinched and sealed to form further longitudinally extending compartments 10 and 11 respectively. In each of the latter compartments 10 and 11, there is located a tensile medium or members 12, 13 respectively. The members 12 and 13 project beyond the wallet material at each laterally extending end thereof. The latter ends, beyond which the members 12 and 13 project, are reinforced by means such as apertured patches 14. At one such end of the boom, each tensile member 12, 13 is fitted with a ring, 15, 16 respectively, whereas at the other end of the boom each tensile member 12, 13 is fitted with a clip 17, 18 respectively.

Each laterally extending end of the wallet 1 is also formed with separate compartments 19, 20, respectively, in which are disposed end stiffening members of rigid material. The latter compartment 19, 20 are pinched and sealed from compartments 2 and 4 along hinge-like pinched lines 21, 22, and are sealed at the extreme ends of the wallet at 23, 24, respectively. Secured to the end stiffening members in compartments 19 and 20, are respective elements 25, 26, such as press (stud) fasteners or other couplingtype of fastening means. Thus, adjacent booms can be secured together by coupling the fasteners on the respective end stiffening members, and by coupling the clips and rings at the ends of the respective tensile members.

The upper longitudinally extending edge of the boom is provided with, preferably, rope handles 27. The opposite ends of each rope handle 27 project through appropriate apertures formed in respective pairs of plate members 29, and are knotted to remain in place. Each plate member 29 is provided with adhesive strips 29a which embrace and adhere to the upper longitudinally extending edge of the boom.

It will be appreciated that when the boom is placed in water, and the buoyant compartments 6 and 7 are inflated, the boom will float in a stable position with the ballast compartment 4 submerged under water and with that part of the first compartment 2 above the buoyant compartments above water. The boom thus forms a barrier to floating pollutants.

Preferred materials for the wallet 1 are polyvinylchloride or polyethylene, or woven or nonwoven fabric coated with polyvinylchloride or polyethylene. In one method of fabricating the boom shown, a suitable length of plastic or plastics-coated fabric tube is taken, and lines of those portions to be pinched and sealed by preferably heat-welding are marked thereupon. The first seams made are seams 30, 31 (FIG. 3) to define the tensile member-receiving compartments 10, 11. The material is then folded and pinched as shown in FIG. 3, and welded longitudinally along seams 32, 33 to form the buoyant compartments 6 and 7. The ends of these compartments are then sealed at a desired length (preferably substantially the entire length of compartment 2) along lines 34, 35, and excess material is trimmed away.

A longitudinal weld 36, defining the ballast compartment 4, is then made, followed by lateral weld 21 forming part of the end stiffener compartment 19. The end stiffener is then placed in the compartment 19 and that compartment is closed by lateral weld 23. The main body or barrier stiffener 3 is then inserted into compartment 2, after which the ballast compartment 4 is filled with ballast, e.g. sand, using a funnel or tube. Lateral weld 22 is then made to seal in the main body stiffener 3 and the ballast, the other end stiffener is inserted in compartment 20 and lateral weld 24 is made to seal the latter compartment.

The air valves 8, 9 are then attached to the buoyant compartments 6, 7, and these are inflated when desired. The reinforcing patches 14 are then secured, and appropriate holes are punched therein through which the ends of the tensile members 12, 13 project. The members 12, 13, the press fasteners 25, 26 and the handles 27 are then all attached to the boom, which is then ready for use.

Rather than use polyvinylchloride, polyethylene or other plastics which are capable of being heat-welded, the wallet may be formed from paper. A 6-ply extensible paper, manufactured under the Trademark "KRAFT," is particularly suitable, the outer layer being coated with a waterproof material, e.g. polyvinylchloride or polyethylene. Fabrication of the boom shown in the drawings when made of paper may be analagous to the above described method used for polyethylene or plastic sheeting. In each instance, however, the heat welded seams may be replaced by adhesive cement seams, and by waterproof taping fitted over the outermost edges.

Rather than provide inflatable buoyant compartments, the buoyant compartments may be filled with a foamed plastic or buoyant rubber material, preferably a soft foam. The described method of fabrication is then modified by only forming seams 34, 35 at one end of the respective buoyant compartments at the stage previously mentioned, leaving the opposite ends open. The foam material is then placed in these compartments after the second end stiffener has been positioned and sealed in to its compartment 20. Then the other end seams 34, 35 may be made.

It will be understood that other modifications may be made to the materials and to the methods of fabrication described, and that the form of the boom may vary from that shown in the drawings. In particular the described single board 3 may be replaced by a number of smaller boards arranged edge to edge in the wallet 1, and the wallet 1 may be welded between the individual boards to form separate pockets for them. Pre-formed buoyant units may likewise be used, rather than be secured to the wallet 1 by heat welding, adhesive or other means. The boom may of course be fabricated to any desired length and breadth.

What is claimed is:

1. A multi-compartmented floating boom comprising a one-piece flexible sheet means folded over upon itself along the length thereof, a plurality of compartments defined by said one-piece sheet means, each compartment being isolated from another compartment through the intermediary of a pinched portion of said sheet means, each of said pinched portions including a flexible neck portion which is defined by at least one pair of sheet means portions which converge toward one another to a position wherein their corresponding opposed surfaces are adjacent to one another, means for sealing said corresponding opposed surfaces to one another along the length of each of said pinched portions, said plurality of compartments including a pollutant-barrier compartment means containing a stiffening medium, said pollutant-barrier compartment means having upper and lower longitudinally extending end portions, a pair of buoyant compartment means each containing a buoyant-inducing medium and disposed opposite one another along respective opposite faces of said pollutant-barrier compartment means, each of said buoyant compartment means being disposed intermediately between said upper and lower longitudinally extending end portions of said pollutant-barrier compartment means and isolated from the latter through the intermediary of respective ones of said pinched portions, and a ballast-inducing medium secured to said boom along the lower longitudinally extending end portion of said pollutant-barrier compartment means; whereby when said boom floats in the water said upper longitudinally extending end portion is disposed above the water surface and said lower longitudinally extending end portion is disposed below the water surface to, thereby, contain floating debris.

2. A boom as claimed in claim 1, wherein said plurality of compartments includes ballast compartment means containing said ballast-inducing medium and extending along said lower longitudinally extending end portion of said pollutant-barrier compartment means, said ballast compartment means and said pollutant-barrier compartment means being isolated from one another through the intermediary of a respective one of said pinched portions.

3. A boom as claimed in claim 2, wherein said plurality of compartments includes a first edge-reinforcing compartment means containing a first tensile medium, said first edge-reinforcing means extending longitudinally along and being isolated from said ballast compartment means through the intermediary of a respective one of said pinched portions, and a second edge-reinforcing compartment means containing a second tensile medium, said second edge-reinforcing compartment means extending longitudinally along and being isolated from the upper longitudinally extending end portion of said pollutant-barrier compartment means through the intermediary of a respective one of said pinched portions.

4. A boom as claimed in claim 3, wherein each said first and second tensile mediums has a greater tensile strength than the material of which said sheet means is constituted.

5. A boom as claimed in claim 3, wherein said pair of buoyant compartment means are each inflatable and include respective air valves.

6. A boom as claimed in claim 3, wherein said buoyant-inducing medium is a gas.

7. A boom as claimed in claim 3, wherein said buoyant-inducing medium is a foamed plastic.

8. A boom as claimed in claim 3, including handle-carrying means adhesively fastened to said second edge-reinforcing compartment means, said handle-carrying means including a pair of spaced apart strips each adhesively embracing said second edge-reinforcing compartment means, and a carrying element bridging said strips with one another.

* * * * *